Oct. 22, 1968  A. C. SCURLOCK ET AL  3,407,100

MATRIX PROPELLENT FORMULATIONS CONTAINING ALUMINUM

Filed Oct. 28, 1960  4 Sheets-Sheet 1

INVENTORS
ARCH C. SCURLOCK,
KEITH E. RUMBEL and
MILLARD LEE RICE
BY Martha L. Ross
AGENT

United States Patent Office 3,407,100
Patented Oct. 22, 1968

3,407,100
MATRIX PROPELLENT FORMULATIONS CONTAINING ALUMINUM
Arch C. Scurlock, Arlington, Keith E. Rumbel, Falls Church, and Millard Lee Rice, Annandale, Va., assignors to The Susquehanna Corporation, a corporation of Delaware
Filed Oct. 28, 1960, Ser. No. 65,857
16 Claims. (Cl. 149—19)

This invention relates to new propellent compositions. More specifically, it relates to aluminum-containing propellent compositions of exceedingly high propulsive performance.

The term propellant, as employed herein, refers to compositions comprising an organic fuel binder or matrix containing molecularly combined carbon and hydrogen; an oxidizer, and a particular finely divided metal. When introduced into the combustion chamber of a rocket motor and ignited, such compositions generate high temperature gases, which vent out through the restricted nozzle of the motor at a high velocity to produce thrust.

The parameter generally accepted as indicative of the propulsive performance of a rocket propellant is its specific impulse, which is defined as the lbs. of thrust generated per lb. of propellant per second. Although this characteristic of the propellant is very important as a criterion for evaluating its performance, specific impulse is not the sole factor determining optimum performance in a specific application where the rocket system as a whole, including its inert parts, such as weight of the motor casing and payload, must be considered.

The usual objectives of rocket propulsion are the following:
(1) Maximization of altitude and distance attained;
(2) Minimization of time-to-target;
(3) Maximization of thrust.

Each of these objectives is accomplished by maximizing the boost velocity imparted to the rocket device by combustion of the propellant, the boost velocity being the velocity of the rocket at burn-out less velocity at launching.

We have found that the relationship between boost velocity and the characteristics of the propellant, obtained by applying Newton's second law of motion to the rocket, is defined, for an idealized rocket free of gravitational and drag effects and pressure thrust, by the following equation:

$$\Delta U = I_{sp} g_c \log \left[1 + \frac{\rho}{M_i/V_p}\right]$$

where $\Delta U$ = boost velocity = velocity at burn-out less launching velocity
$M_i$ = mass of inert parts including payload-mass of rocket less mass of propellant
$V_p$ = volume occupied by propellant
$I_{sp}$ = specific impulse of the propellant
$g_c$ = dimensional conversion factor, 32.17 (lb. mass) (ft.)/(lb. force) (sec.)$^2$
$\rho$ = density of propellant
$M_i/V_p$ = mass-to-volume ratio From this expression of the relationships which determine boost velocity, it will be seen that two additional factors, the density of the propellant and the ratio of the mass of inert parts to the volume of propellant enclosed within the motor, become exceedingly important, particularly at high $M_i/V_p$ values, as in the case of boosters and JATO's. In fact, a propellant of high specific impulse but low density can be distinctly undesirable for use at high $M_i/V_p$ ratios because of a marked drop in boost velocity efficiency.

The specific impulse of the propellant is, however, an exceedingly important factor in determining boost velocity at any $M_i/V_p$ ratio. A propellant having a high specific impulse and producing optimum boost velocity at formulations coincident with optimum specific impulse is of great value to the rocket art, particularly in applications requiring high propulsive performance.

The object of this invention is to provide propellent compositions of high specific impulse which produce maximized boost velocities over a wide range of $M_i/V_p$ ratios.

Other objects and advantages will become obvious from the following detailed description and the drawings in which.

Figure 1:
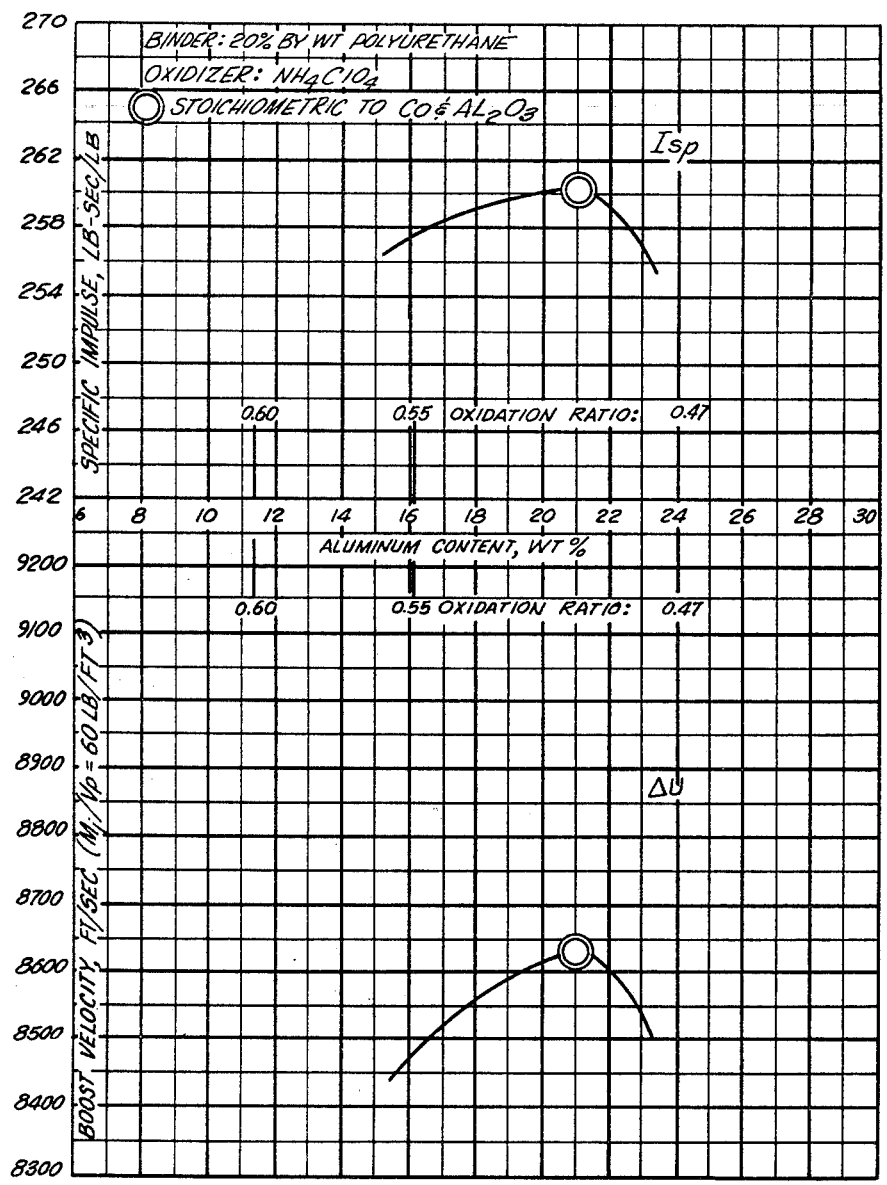
FIGURES 1 through 3 are graphs comparing performance in terms of boost velocity and specific impulse of propellent formulations containing Al in different organic binders.

Broadly speaking, the invention comprises propellent compositions consisting essentially of a finely divided, solid, inorganic oxidizer and powdered aluminum dispersed in an organic fuel matrix containing molecularly combined carbon and hydrogen, in which the oxidizer and fuel components are present in a particular ratio by weight in terms of the number of atomic equivalents, defined as follows:

$$\text{Oxidation Ratio} = \frac{O}{O + C + M\left(\frac{v}{2}\right)} =$$

about 0.47–0.60, preferably 0.47 to 0.55
wherein O equals the total amount of oxygen in the propellent composition; C equals the total amount of carbon; M equals the total amount of Al; and $v$ equals the valence of the Al, preferably its characteristic valence in its most stable oxide, which is 3. Thus in the case of the following reaction:

$$C + 2Al + 4O = CO + Al_2O_3$$

the Oxidation Ratio = 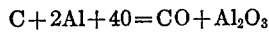 = 0.5

All molecularly combined oxygen, both in the inorganic oxidizer and in the organic fuel matrix, is included in the determination of total oxygen. Oxygen available for oxidation reaction, as, for example, the active oxygen present in the inorganic oxidizer or in an organic compound, such as a nitrate or nitrite derivative, functions to oxidize molecularly-combined carbon to CO and the metal fuel component to its oxide. Oxygen molecularly bonded to a carbon atom in an organic fuel compound, as, for example, in the case of an ether, alcohol, aldehyde, ketone, ester, amide, etc., though not available for combustion, nevertheless results, by decomposition reaction, in the formation of CO, the desired propulsive gas product. In cases such as organic acids, where decomposition might normally result in the production of $CO_2$, under the conditions defined above the Oxidation Ratio, one of the oxygen atoms preferentially combines with the metal fuel component.

When the components are present in a ratio by weight such that the Oxidation Ratio, as defined above, is 0.5, which will hereinafter be termed an OMOx formulation, the oxygen available for combustion of the fuel is stoichiometrically sufficient to oxidize the carbon not already linked to oxygen in the organic fuel to CO and the metal to its oxide. Under such conditions, the molecularly combined hydrogen in the organic fuel compound after ignition of the propellant composition, forms free hydrogen gas, since the molecularly combined carbon and the Al react preferentially with oxygen relative to the hydrogen. The hydrogen gas evolved is heated to a high temperature because of the high exotherm of the oxidizing metal. This, and its low molecular weight make it a very efficient thrust-producing component in the combustion reaction product.

We have discovered that propellant formulations containing finely divided aluminum as a highly exothermic fuel component, has maximum specific impulse and imparts optimum boost velocity to the rocket system when the ratio of oxygen to fuel (organic and metal) is at OMOx or closely approaches OMOx, namely where the Oxidation Ratio equals about 0.47 to 0.60 and, in many applications, preferably about 0.47 to 0.55. The Al fuel, in such formulations, has the additional, highly advantageous characteristic of forming a highly stable oxide which does not decompose to any substantial degree after formation, either under the high temperature, high pressure conditions prevailing in the combustion chamber of during venting of the combustion gases out of the nozzle. Dissociation and/or vaporization of the metal oxide are undesirable since such phenomena absorb substantial amounts of heat energy, thereby reducing the temperature and pressure of the low molecular weight, thrust-producing combustion gases.

Figure 2:
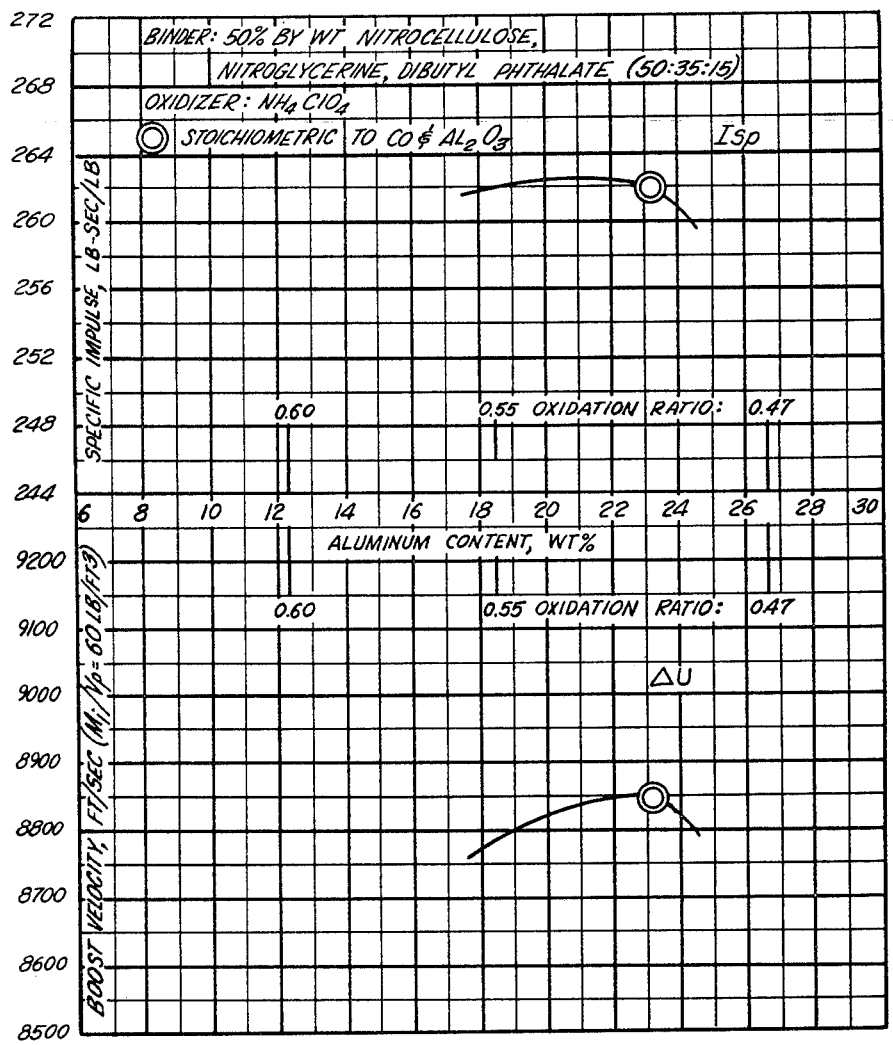
Figure 3:
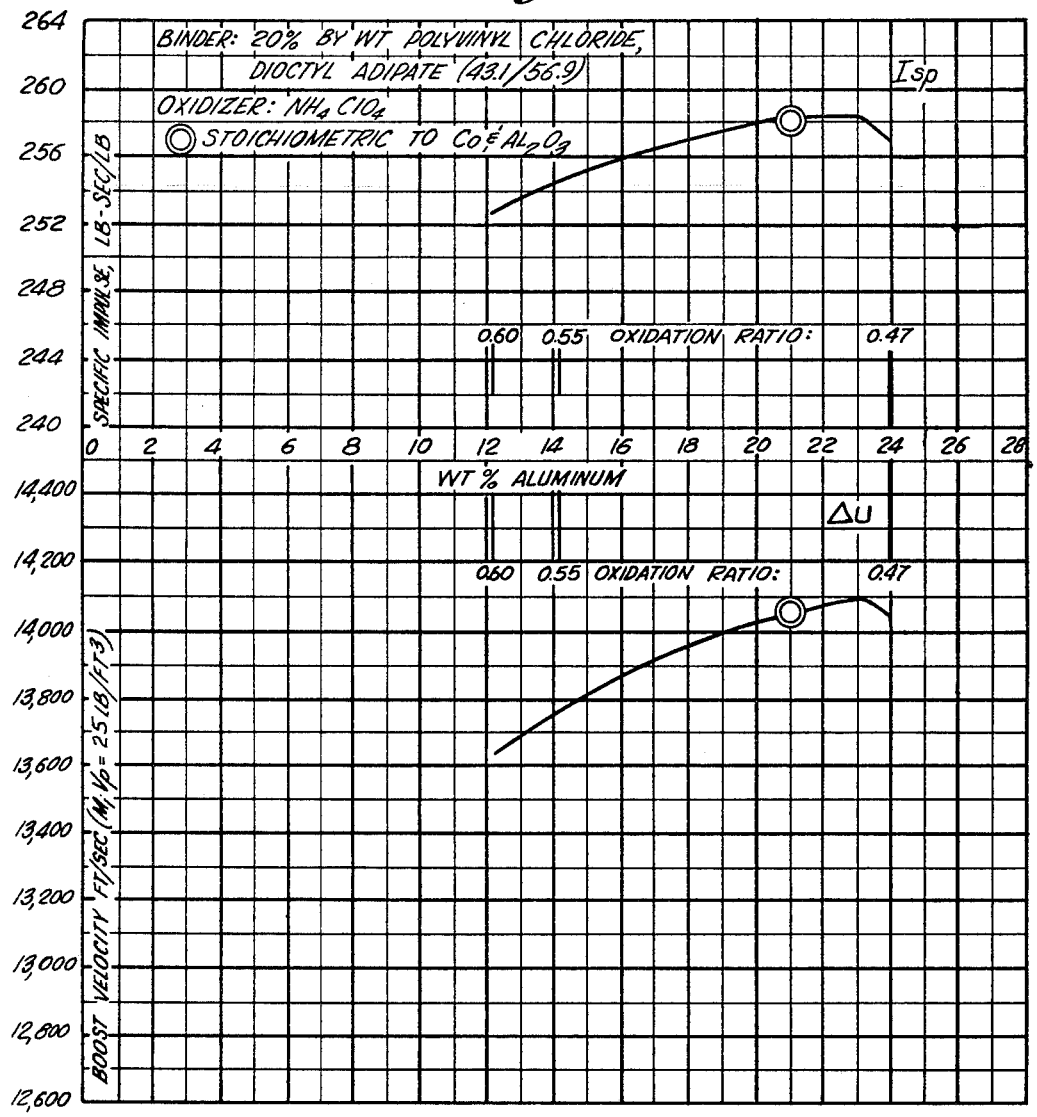

The findings are graphically illustrated by the data summarized on the graphs of FIGURES 1, 2, and 3. FIGURE 1 shows the curves for specific impulse and boost velocity of formations comprising Al and ammonium perchlorate in a polyurethane fuel binder. This binder comprises a mixture of 56.6% P–2 prepolymer (polypropylene glycol prepolymerized with an excess of tolylene diisocyanate, molecular weight 2025), 13.7% castor oil, 28.1% dioctyl azelate, 0.15% ferric acetyl acetonate, 1% lecithin, and 0.7% phenyl-$\beta$-naphthylamine. FIGURES 2 and 3 summarize similar data for formulations employing a double base binder consisting of nitrocellulose gelled with a mixture of nitroglycerine and dibutyl phthalate, and a binder comprising polyvinyl chloride plasticized with dioctyl adipate, respectively. All data were determined assuming shifting chemical equilibrium. The boost velocity was determmned at an $M_i/V_p$ ratio of 60 lbs./cu. ft., except for FIGURE 3, where the ratio was 25 lbs./cu. ft. It will be noted that in all types of formulation, the highest specific impulse and the highest boost velocity are obtained within the Oxidation Ratio range of 0.47 to 0.60 with a peak at or very close to OMOx. Both the specific impulse and the boost velocity are high. in the case of the polyurethane composition the maxima being 260.2 lb.-sec./lb. and 8630 ft./sec. respectively, in the case of the double base composition 262.4 lb.-sec./lb. and 8850 ft./sec., and in the case of the plasticized polyvinyl chloride formulation 258.4 lb.-sec./lb. and 14,100 ft./sec.

It will be further noted that the curves for maximum boost velocity conform closely to those for maximum specific impulse, a characteristic which is highly advantageous since such propellent compositions provide consistently high performance over a wide range of $M_i/V_p$ ratios.

Figure 4:
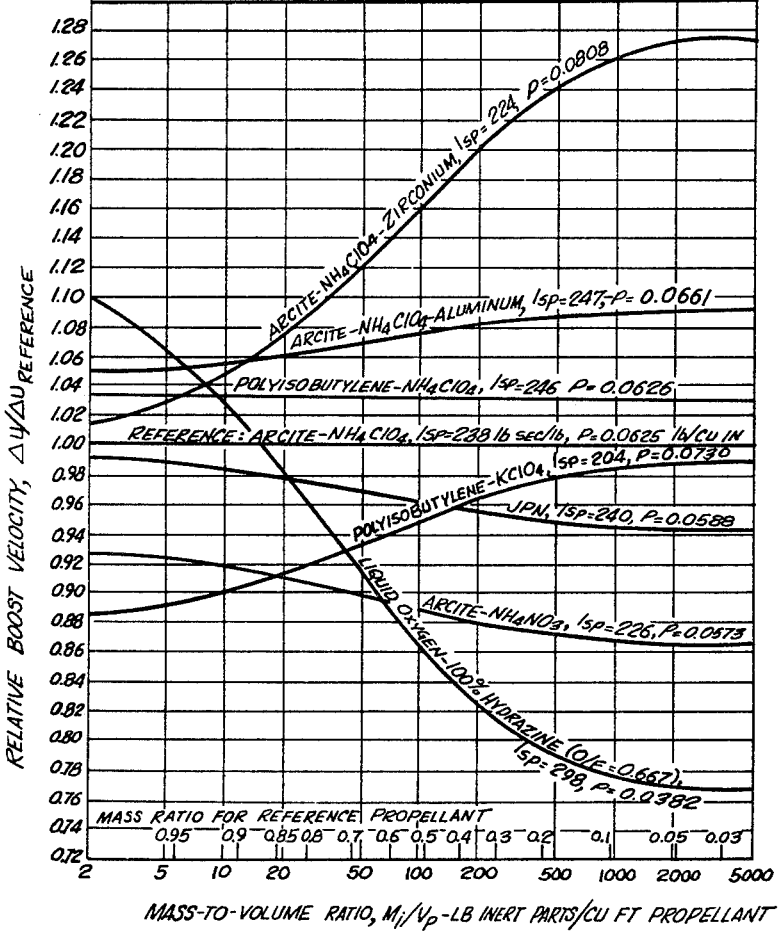
FIGURE 4 is a graph comparing the performance of several propellants of different specific impulse and density at different ratios of the mass of the inert parts of the rocket vehicle to volume of propellant.

FIGURE 4 compares the performance of a number of propellent compositions relative to a reference propellant, on propulsion of an idealized rocket vehicle, i.e., one for which the effects of drag, gravity, and pressure thrust are neglected, exhausting to 14.7 p.s.i. from a combustion chamber pressure of 1000 p.s.i. It will be noted that the aluminum-containing propellant shows consistently high performance in terms of boost velocity relative to that of the reference propellant, whereas the very dense Zr-containing propellant, while exceedingly effective at high $M_i/V_p$ ratios, drops rather sharply in performance at low-density propellant comprising a mixture of liquid oxygen and hydrazine, while performing well at low $M_i/V_p$ ratios, drops sharply in boost velocity performance at high ratios. Since the density of Al (2.7) is significantly higher than that of the commonly employed oxidizing salts, such as $NH_4ClO_4$ (1.95) and $NH_4NO_3$ 1.73), it functions as a densifying component in the propellant composition which is reflectes in increased boost velocities at high $M_i/V_p$ ratios, as shown in FIGURE 4.

As aforementioned, the organic fuel matrix can be any suitable organic compound or mixture of organic compounds which contains molecularly combined carbon and hydrogen, so that at OMOx stoichiometry it burns and/or decomposes to produce CO and free hydrogen gas. It can be "inert," the term "inert" as used herein meaning compound which requires an external source of oxygen, namely the solid, inorganic oxidizer, for combustion. Illustrative of suitable organic matrix compositions are the various solid polymeric binders, such as polyether polysulfides, polyurethanes, butadiene-acrylic acid and -methacrylic acid copolymers cross-linked with an epoxy, alkyd polyesters, polyamides, cellulose esters, e.g., cellulose acetate, cellulose ethers, e.g., ethyl cellulose, polyvinyl chloride, asphalt, and the like. The oxygen linked to carbon in a variety of such inert fuel binders produces CO by decomposition reaction.

Many of the solid polymeric binders preferably include high-boiling, organic, liquid plasticizers to improve physical properties and processing of the propellent composition. Any of the numerous organic plasticizers known in the art and compatible with the propellent compositions can be employed. Illustrative examples of suitable organic plasticizers include sebacates such as dibutyl sebacate and dioctyl sebacate; phthalates, such as dibutyl phthalate and dioctyl phthalate; adipates, such as dioctyl adipate; glycol esters of higher fatty acids, and the like.

The organic fuel matrix can also comprise an active organic compound, a mixture of such compounds, or a mixture of such a compound with an inert organic compound, such as an inert organic plasticizer, the term "active" compound as employed herein meaning a compound which contains molecularly combined oxygen available for combustion of other components of the molecule, such as carbon. Examples of active organic fuel compounds include those containing nitroso, nitro, nitrite, and nitrate radicals, such as cellulose nitrate and nitroglycerine.

The foregoing description has dealt mainly with solid propellant compositions in which the organic fuel binder is a solid. The invention can also be employed in semisolid, composite monopropellent systems. Such compositions are thixotropic, cohesive, shape-retentive compositions which can be extruded under moderate pressures into the combustion chamber of a rocket, where they form continuously advancing columns which burn on the exposed surface. In accordance with this invention, such plastic monopropellent compositions comprise a stable dispersion of a finely divided, insoluble oxidizer and the finely-divided Al in a continuous matrix of any suitable high-boiling organic liquid fuel containing molecularly combined carbon and hydrogen. Illustrative of suitable liquid fuels are hydrocarbons, such as triethyl benzene, liquid polyisobutylene, and the like; organic esters, such as dimethyl maleate, dibutyl oxalate, dibutyl phthalate and nitroglycerine; alcohols, such as benzyl alcohol and triethylene glycol; ethers, such as methyl β-naphthyl ether; and many others.

Any solid inorganic oxidizer can be employed which yields oxygen readily for combustion of the metal fuel component and the organic matrix, where the latter contains no oxygen or insufficient oxygen for CO stoichiometry. Such oxidizers include the inorganic oxidizer salts, such as $NH_4$, K, Na, and Li perchlorates and nitrates, metal peroxides, such as $CaO_2$, $BaO_2$, and $Na_2O_2$, and the like, the salts being preferred.

Where the organic fuel matrix contains molecularly combined oxygen available in at least the stoichiometric amount required for oxidation and/or decomposition of the molecularly combined carbon component to CO, no inorganic oxidizer need be provided for its combustion. If such available, combined oxygen is present in amounts greater than that required for such stoichiometry, the amount in excess preferentially oxidizes the powdered metal component rather than the molecularly combined hydrogen and thus can replace a portion of the inorganic oxidizer which would normally be required to oxidize the metal.

The organic fuel matrix, whether it be inert or active, solid or liquid, as aforedescribed, must comprise at least about 20%, in some cases preferably at least 30%, by volume of the propellent composition. This is essential both to provide for an adequate degree of low molecular weight combustion gas generation requisite for effective propulsion and for processing of a cohesive propellent composition having good physical properties.

The amount of Al and solid, inorganic oxidizer employed must be such as to produce, with the particular organic matrix, an Oxidation Ratio within the specified range of about 0.47 to 0.60. This can readily be calculated by use of the equation given above for determination of this expression.

The following examples are illustrative of propellent formulations within the scope of this invention:

EXAMPLE 1

A solid, perforated, internally-burning, polyurethane propellent grain, 6 inches in diameter and weighing 10 lbs., was made from the following OMOx composition:

| | Weight percent |
|---|---|
| P-2 prepolymer [1] | 11.27 |
| Castor oil | 2.74 |
| Dioctyl azelate | 5.62 |
| Ferric acetyl acetonate | 0.03 |
| Lecithin | 0.20 |
| Phenyl-β-naphthylamine | 0.14 |
| Aluminum powder | 21.04 |
| $NH_4ClO_4$ | 58.96 |

[1] Polypropylene glycol prepolymerized with an excess of tolylene diisocyanate. Molecular weight 2025.

The grain was inserted into a rocket motor and static fired. Burning rate was 0.186 in./sec. at a combustion chamber pressure of 1130 p.s.i.

EXAMPLE 2

A solid, perforated, internally-burning grain, 6 inches in diameter and weighing 10 lbs., was prepared from a mixture of the following components:

| | Weight percent |
|---|---|
| $NH_4ClO_4$ | 26.78 |
| Al powder | 23.22 |
| Nitrocellulose (12.6% N) (spheres about 15 microns in diameter) | 21.50 |
| Nitroglycerin/dibutyl phthalate 75/25 | 25.02 |
| Dibutyl sebacate | 2.48 |
| 2-Nitrodiphenylamine | 1.00 |

The propellant was prepared by the plastisol method. The components were mixed at room temperature and the mixture was then placed in a mold and cured by heating to dissolve the nitrocellulose in the nitroglycerine, dibutyl phthalate, and dibutyl sebacate plasticizers. This formulation was OMOx. The propellant grain burned at a rate of 0.468 in./sec. at a combustion chamber pressure of 900 p.s.i.

EXAMPLE 3

A solid, perforated, internally-burning grain was made from a mixture of the following components:

| | Weight percent |
|---|---|
| $NH_4ClO_4$ | 58.90 |
| Polyvinyl chloride, stabilized | 8.96 |
| Dioctyl adipate | 10.79 |
| Al powder | 21.10 |
| Glyceryl monooleate, pentaerythritol dioleate, dioctyl sodium sulfosuccinate 1:1:1 | 0.25 |

The propellant was prepared according to the plastisol method by blending the components at room temperature, pouring the mixture into a mold and heating to dissolve the PVC in the liquid plasticizer, thereby forming a rigid gel. Oxidation Ratio of the propellent composition was OMOx. The grain, fired in a 5-inch diameter rocket motor, burned at a rate of 0.35 in./sec. at a combustion chamber pressure of 1,100 p.s.i. Measured specific impulse was 252 lb.-sec./lb.

Although this invention has been described with reference to illustrative embodiments thereof, it will be apparent to those skilled in the art that the principles of this invention can be embodied in other forms but within the scope of the claims.

We claim:

1. In a rocket propellent composition which burns to produce propulsive gases and which consists essentially of a finely-divided, solid, inorganic oxidizer, containing combined oxygen which it yields readily for combustion of the fuel components of said composition, and finely-divided aluminum fuel dispersed in an organic fuel matrix containing molecularly combined carbon and hydrogen, said organic fuel matrix comprising at least about 20 percent by volume of said composition, the improvement in which said oxidizer, said aluminum, and said organic fuel matrix are present in amounts such that the following expression:

$$\frac{O}{C+O+M\left(\frac{v}{2}\right)} \text{ equals about 0.47 to 0.60}$$

wherein O equals the total amount of combined oxygen in the composition, C equals the total amount of carbon, M equals the amount of aluminum, said O, C and M being expressed in terms of the number of atomic equivalents, and v equals the valence of the aluminum.

2. The propellent composition of claim 1 in which the organic fuel matrix comprises at least about 30% by volume of the composition.

3. The propellent composition of claim 1 in which the oxidizer is an inorganic oxidizer salt.

4. The propellent composition of claim 3 in which the organic fuel matrix comprises an organic polymer.

5. The propellent composition of claim 4 in which the Oxidation Ratio equals 0.5.

6. The propellent composition of claim 4 in which the oxidizer salt is ammonium perchlorate.

7. The propellent composition of claim 4 in which the organic fuel matrix comprises nitrocellulose.

8. The propellent composition of claim 7 in which the nitrocellulose is plasticized with nitroglycerine.

9. The propellent composition of claim 7 in which the oxidizer salt is ammonium perchlorate.

10. The propellent composition of claim 4 in which the organic fuel matrix comprises polyurethane.

11. The propellent composition of claim 10 in which the oxidizer salt is ammonium perchlorate.

12. The propellent composition of claim 1 in which the expression:

$$\frac{O}{O+C+M\left(\frac{v}{2}\right)}$$ equals about 0.47 to 0.55

13. The propellent composition of claim 12 in which the organic fuel matrix comprises at least about 30% by volume of the composition.

14. The propellent composition of claim 12 in which the organic fuel matrix comprises nitrocellulose.

15. The propellent composition of claim 14 in which the nitrocellulose is plasticized with nitroglycerine.

16. The propellent composition of claim 14 in which the oxidizer is ammonium perchlorate.

References Cited

UNITED STATES PATENTS 2,931,437  4/1960  Smith _____ 52—.5 X
2,970,898  2/1961  Fox _____ 52—.5

OTHER REFERENCES

Chem. and Eng. News, July 27, 1959, pages 22 and 23.
Kit et al., "Rocket Propellant Handbook," The MacMillan Co., New York, pages 39 to 42.

BENJAMIN R. PADGETT, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,407,100            October 22, 1968

Arch C. Scurlock et al.

It is certified that error appears in the above identified patent and that said Letters Patent are hereby corrected as shown below:

Column 1, line 56, "payload-mass" should read -- payload=mass --. Column 3, line 6, after "above" insert -- for --; line 37, "of" should read -- or --. Column 4, line 15, after "low" insert -- ratios and the low- --; line 22, "reflectes" should read -- reflected --. Column 6, line 28, "252" should read -- 242 --.

Signed and sealed this 10th day of March 1970.

(SEAL)
Attest:

Edward M. Fletcher, Jr.
Attesting Officer

WILLIAM E. SCHUYLER, JR.
Commissioner of Patents